United States Patent
Yoon et al.

(10) Patent No.: US 7,688,331 B2
(45) Date of Patent: Mar. 30, 2010

(54) METHOD AND SYSTEM FOR COLOR CORRECTION OF IMAGE SIGNALS

(75) Inventors: Sung-Yoon Yoon, Suwon-Si (KR); Timofei Uvarov, Suwon-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 479 days.

(21) Appl. No.: 11/709,399

(22) Filed: Feb. 22, 2007

(65) Prior Publication Data
US 2007/0195383 A1    Aug. 23, 2007

(30) Foreign Application Priority Data
Feb. 22, 2006    (KR) ............... 10-2006-0017242

(51) Int. Cl.
    G03F 3/08     (2006.01)
    G09G 5/00     (2006.01)
    G09G 5/02     (2006.01)
    H04N 5/94     (2006.01)
    G06K 9/00     (2006.01)
    G06K 9/32     (2006.01)
    G06F 15/00    (2006.01)
    G06K 1/00     (2006.01)
    H04N 1/46     (2006.01)

(52) U.S. Cl. .............. 345/591; 345/589; 345/581; 345/606; 345/643; 348/557; 348/708; 348/807; 358/518; 358/525; 358/447; 382/162; 382/167; 382/254; 382/300; 715/700

(58) Field of Classification Search ............... 345/581, 345/589, 591–594, 600, 606, 619, 601, 643–644, 345/679, 549; 348/496–498, 557, 560, 599, 348/708, 807; 358/518–519, 525, 447, 1.9, 358/1.1; 382/162, 167, 254, 300; 715/700, 715/781, 273, 275, 782, 848, 850
See application file for complete search history.

(56) References Cited

U.S. PATENT DOCUMENTS

| | | | |
|---|---|---|---|
| 7,502,112 B2 * | 3/2009 | Kahn et al. | 356/406 |
| 2003/0016218 A1 * | 1/2003 | Zwicker et al. | 345/424 |
| 2004/0233214 A1 * | 11/2004 | Lebowsky et al. | 345/589 |
| 2006/0139644 A1 * | 6/2006 | Kahn et al. | 356/406 |

OTHER PUBLICATIONS

Korean Patent Application No. 1019960014711 to Oh, having Publication date of Jan. 19, 1999 (w/ English Abstract page).

(Continued)

*Primary Examiner*—Wesner Sajous
(74) *Attorney, Agent, or Firm*—Monica H. Choi (57) ABSTRACT

In a method and system for performing color correction for an image signal, a first set of matrix coefficients for color correction of the image signal in a 3-dimensional RGB color space is transformed to a first set of points of a two-dimensional XY plane. In addition, the first set of points is modified to a second set of points in the XY plane for tuning image quality. Furthermore, the first and second sets of points in the two-dimensional XY plane are displayed such as on a graphical user interface of a computer system.

20 Claims, 5 Drawing Sheets

OTHER PUBLICATIONS

Japanese Patent Application No. 09-061259 to Tomoji et al., having Publication date of Sep. 25, 1998 (w/ English Abstract page).

Japanese Patent Application No. 2002-134145 to Masaya, having Publication date of Nov. 21, 2003 (w/ English Abstract page).

* cited by examiner

METHOD AND SYSTEM FOR COLOR CORRECTION OF IMAGE SIGNALS

This application claims priority under 35 USC §119 to Korean Patent Application No. 2006-17242, filed on Feb. 22, 2006 in the Korean Intellectual Property Office, the disclosure of which is incorporated herein in its entirety by reference.

BACKGROUND OF THE INVENTION

1. Field of the Invention

The present invention relates generally to color correction of an image signal, and more particularly, to tuning color correction matrix coefficients with a visualization aid from transformation into an XY plane.

2. Background of the Invention

Equation 1 below shows a 3×3 color correction matrix used for color correction of an image signal comprised of color signals Rin, Gin, and Bin:

$$\begin{pmatrix} Rout \\ Gout \\ Bout \end{pmatrix} = \begin{pmatrix} r1 & g1 & b1 \\ r2 & g2 & b2 \\ r3 & g3 & b3 \end{pmatrix} \begin{pmatrix} Rin \\ Gin \\ Bin \end{pmatrix} \quad \text{Equation 1}$$

As shown, RGB (red, green, and blue) values of color signals Rin, Gin, and Bin are tuned to Rout, Gout, and Bout with the 3×3 matrix. That is, the tuned image signal has RGB values of Rout, Gout and Bout as shown in Equations 2, 3, and 4 below:

$$Rout = r1*Rin + g1*Gin + b1*Bin \quad \text{Equation 2}$$

$$Gout = r2*Rin + g2*Gin + b2*Bin \quad \text{Equation 3}$$

$$Bout = r3*Rin + g3*Gin + b3*Bin \quad \text{Equation 4}$$

According to such mathematical models, matrix coefficients for a desired color correction such as r1, g1, b1, r2, g2, b2, r3, g3, and b3, may be obtained. Herein, influence of gamma and shading are considered for the color correction coefficients for desired color correction. However, intuitive estimation of the color correction coefficients of the matrix for the target color correction is difficult using the mathematical models.

In the prior art, such color correction coefficients are not intuitively recognized. Instead in the prior art, the image signals are tuned by repeatedly modifying the color correction coefficients based on personal experience without any regulated rules. Therefore, tuning the image signal according to the prior art is time consuming and requires much effort.

SUMMARY OF THE INVENTION

For a method and system for performing color correction for an image signal according to an aspect of the present invention, a first set of matrix coefficients for the image signal in a n-dimensional color space are transformed to a first set of points of a two-dimensional XY plane, with n being greater than 2. In addition, the first set of points is modified to a second set of points in the XY plane for tuning image quality. Furthermore, the first and second sets of points in the two-dimensional XY plane are displayed such as on a graphical user interface of a computer system.

In another embodiment of the present invention, the second set of points in the XY plane is transformed to a second set of matrix coefficients in the n-dimensional color space.

In a further embodiment of the present invention, the first matrix coefficients and the second matrix coefficients are each for a respective 3×3 matrix of color correction values in RGB color space.

In another aspect of the present invention, a respective coefficient sum of each of all rows of the matrix coefficients is equal to a same value such as 1 for example.

In another embodiment of the present invention, the first set of points are modified to the second set of points by changing distance of each of the first to third point of the first set to the origin of the XY plane.

In a further embodiment of the present invention, the origin of the XY plane is a center point of a unit cube of the RGB color space. In addition, a Y axis of the XY plane is a line connecting the origin to a B axis of the RGB color space, and an X axis of the XY plane is a line perpendicularly crossing the Y axis at the origin.

According to an example embodiment of the present invention, the first set of matrix coefficients are transformed to the first set of points of the XY plane according to the following equations:

$$xi = (gi - ri)/\sqrt{2}; \text{ and}$$

$$yi = (bi - di/3)*\sqrt{gi/2};$$

with xi and yi being a point in the XY plane for ri, gi, and bi representing an i-th row for the first set of matrix coefficients in the RGB color space, and with di being a sum of ri, gi, and bi. In addition, the second set of points in the XY plane is transformed to the second set of matrix coefficients in the RGB color space according to the following equations:

$$ri' = (-1/\sqrt{2})*xi' - (1/\sqrt{6})*yi' + di'/3;$$

$$gi' = (1/\sqrt{2})*xi' - (1/\sqrt{6})*yi' + di'/3; \text{ and}$$

$$bi' = (-2/\sqrt{6})*yi' + di'/3;$$

with ri', gi', and bi' representing an i-th row for the second set of matrix coefficients in the RGB color space, and with xi' and yi' being modified from xi and yi, and with di' being a sum of ri', gi', and bi'.

In a further embodiment of the present invention, a first point of the first set is for a R among RGB, and is placed at a region between 150° and 270° from a positive X-axis of the XY plane. Additionally, a second point of the first set is for a G among RGB, and is placed at a region between 270° and 30° from the positive X-axis. Also, a third point of the first set is for a B among RGB, and is placed at a region between 30° and 150° from the positive X-axis.

The present invention may be used to particular advantage when a memory device stores sequences of instructions (i.e., software) thereon. Execution of such sequences of instructions by a data processor causes the data processor to perform the above stated steps for tuning such RGB color correction coefficients.

In this manner, the color correction coefficients of the RGB space are transformed into the XY plane and are displayed for tuning with intuitive visualization.

BRIEF DESCRIPTION OF THE DRAWINGS

The above and other features and advantages of the present invention will become more apparent when described in detailed exemplary embodiments thereof with reference to the attached drawings in which.

The figures referred to herein are drawn for clarity of illustration and are not necessarily drawn to scale. Elements having the same reference number in FIGS. 1, 2, 3, 4, 5, 6A, 6B, and 7 refer to elements having similar structure and/or function.

DETAILED DESCRIPTION OF THE INVENTION

Figure 1:
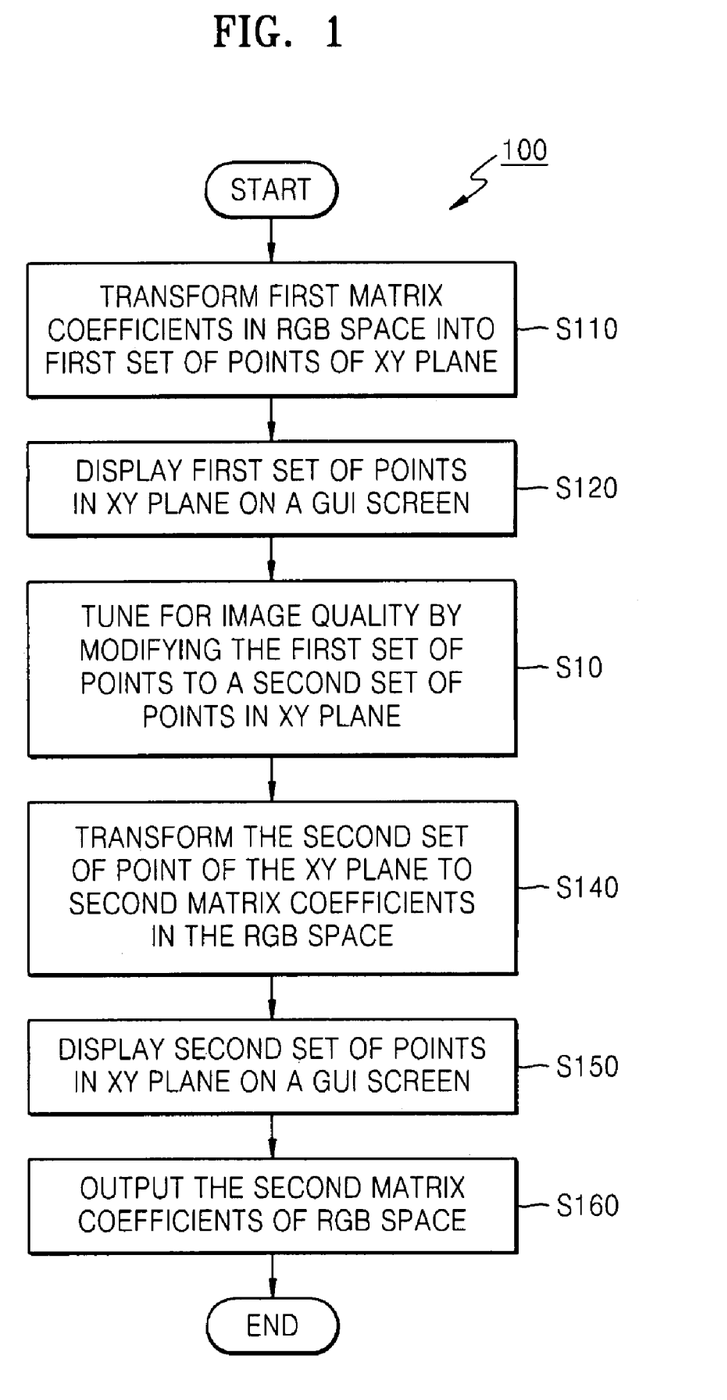
FIG. 1 is a flowchart of steps for performing color correction with visualization according to an embodiment of the present invention.
Figure 5:
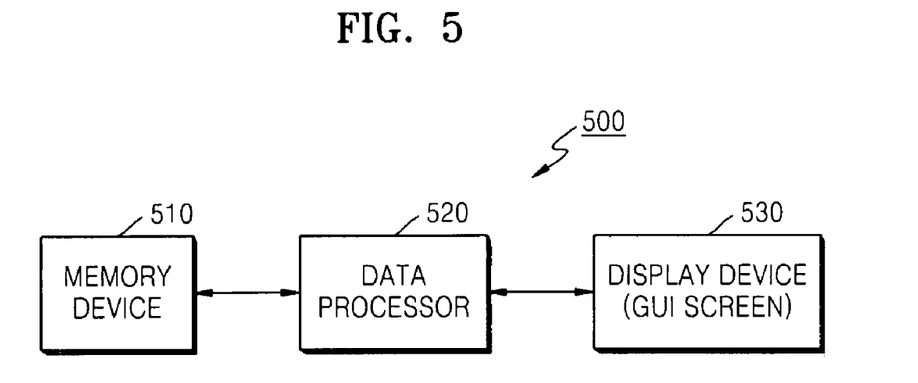
FIG. 5 is a block diagram of a system for performing the steps of the flowchart of FIG. 1, according to an embodiment of the present invention.

FIG. 1 is a flowchart of steps for performing color correction with visualization according to an embodiment of the present invention. FIG. 5 shows a block diagram of a system 500 for performing color correction with visualization according to an embodiment of the present invention.

Referring to FIG. 5, the system 500 includes a display device 530, a data processor 520, and a memory device 510 having sequences of instructions (i.e., software) stored thereon. Execution of such sequences of instructions by the data processor 520 causes the data processor 520 to perform the steps of the flowchart of FIG. 1. The system 500 is a computer system in one example embodiment of the present invention. In that case, the display device 530 is a graphical user interface screen.

Referring to FIGS. 1 and 5, the data processor 520 starts with a first set of matrix coefficients such as r1, g1, b1, r2, g2, b2, r3, g3, and b3 for an initial 3×3 color correction matrix as represented by Equations 1, 2, 3, and 4 for example. Such matrix coefficients are for a three-dimensional RGB space. The data processor 520 transforms such a first set of matrix coefficients r1, g1, b1, r2, g2, b2, r3, g3, and b3 to a first set of points of a two-dimensional XY plane (step S10 of FIG. 1).

In addition, according to an embodiment of the present invention, a respective sum of the ri, gi, and bi (with i=1, 2, and 3) matrix coefficients is a same constant value such as 1. A respective sum di of the ri, gi, and bi (with i=1, 2, and 3) matrix coefficients for each row of the initial 3×3 color correction matrix is represented by the following Equations 5, 6, and 7:

$$r1+g1+b1=d1 \qquad \text{Equation 5}$$

$$r2+g2+b2=d2 \qquad \text{Equation 6}$$

$$r3+g3+b3=d3 \qquad \text{Equation 7}$$

In one example embodiment of the present invention, d1=d2=d3=1.

Figure 2:
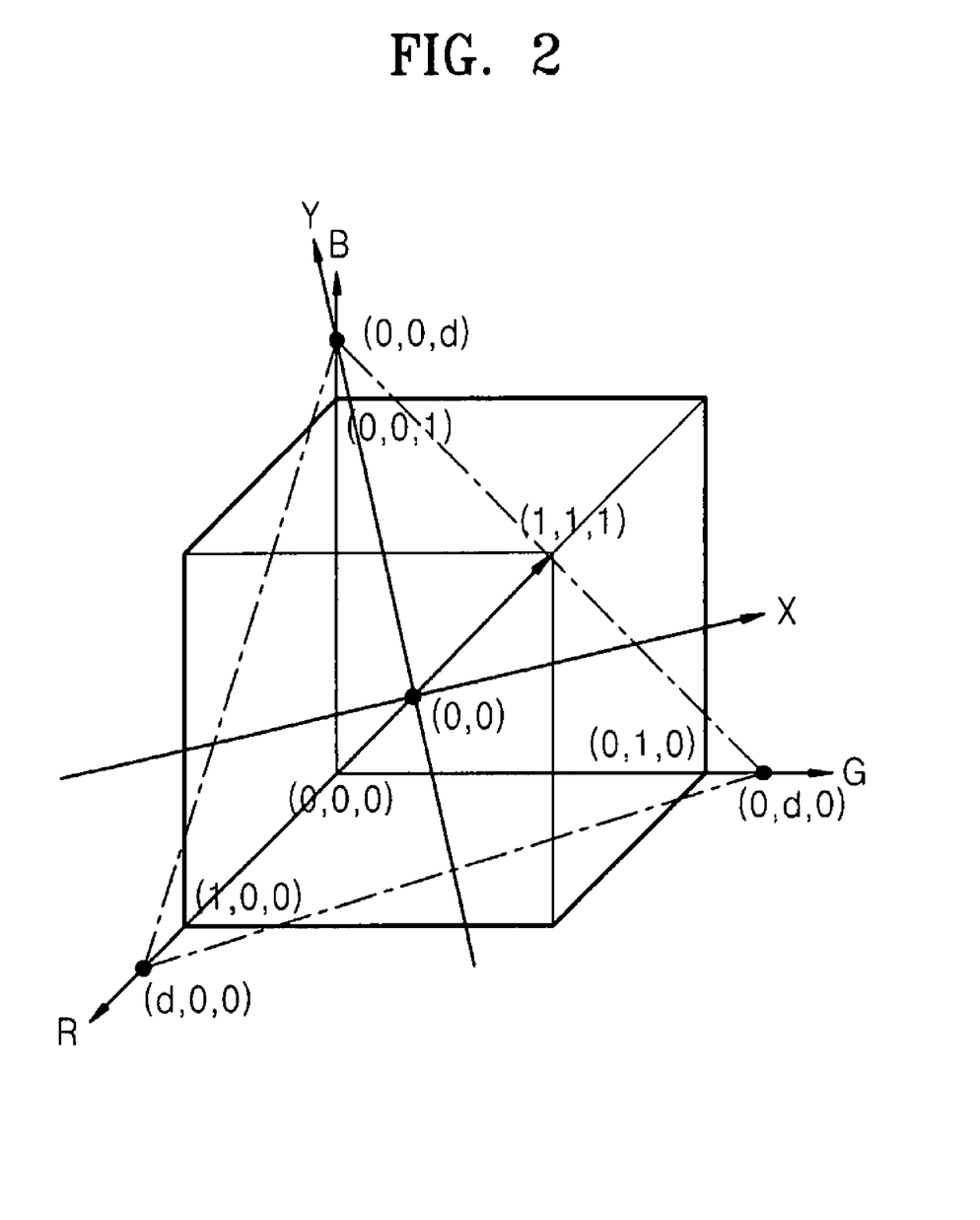
FIG. 2 illustrates a two-dimensional XY plane transformed from a three-dimensional RGB space, according to an embodiment of the present invention.

FIG. 2 illustrates determination of the two-dimensional XY plane from the three-dimensional RGB space, according to one example embodiment of the present invention. First, a unit cube is defined from points (1, 0, 0), (0, 1, 0), and (0, 0, 1) in the three-dimensional RGB space. A center point that is equidistant from such points (1, 0, 0), (0, 1, 0), and (0, 0, 1) in the three-dimensional RGB space is determined to be an origin (0, 0) of the two-dimensional XY plane.

In addition, a line connecting the origin (0, 0) to a B axis of the RGB space is used as a Y axis of the XY plane, and an X axis of the XY plane is a line perpendicularly crossing the Y axis of the XY plane at the origin (0, 0).

Figure 3:
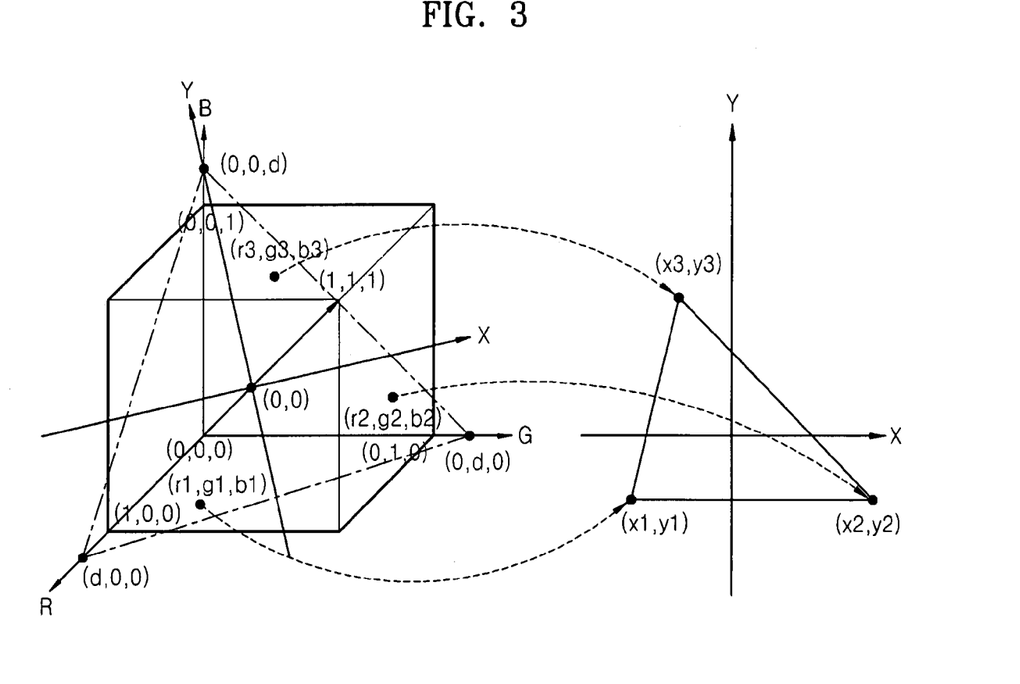
FIG. 3 is a conceptual view illustrating transforming matrix coefficients of the three-dimensional RGB space to points in the two-dimensional XY plane, in the steps of the flowchart of FIG. 1 according to an embodiment of the present invention.

FIG. 3 is a conceptual view illustrating transformation of the first set of matrix coefficients of the three-dimensional RGB space to points in the two-dimensional XY plane (step S110 of FIG. 1), according to an embodiment of the present invention. Referring to FIG. 3, a first point (r1, g1, and b1) in the three-dimensional RGB space is transformed into a first point (x1, y1) in the two-dimensional XY plane.

Similarly, a second point (r2, g2, and b2) in the three-dimensional RGB space is transformed into a second point (x2, y2) in the two-dimensional XY plane. Furthermore, a third point (r3, g3, and b3) in the three-dimensional RGB space is transformed into a third point (x3, y3) in the two-dimensional XY plane.

The points (x1, y1), (x2, y2), and (x3, y3) form a first set of points in the XY plane transformed from the first matrix coefficients (r1, g1, b1), (r2, g2, b2), and (r3, g3, b3), respectively, according to the following Equations 8, 9, 10, 11, 12, and 13:

$$x1=(g1-r1)/\sqrt{2} \qquad \text{Equation 8}$$

$$y1=(b1-d1/3)*\sqrt{g1/2} \qquad \text{Equation 9}$$

$$x2=(g2-r2)/\sqrt{2} \qquad \text{Equation 10}$$

$$y2=(b2-d2/3)*\sqrt{g2/2} \qquad \text{Equation 11}$$

$$x3=(g3-r3)/\sqrt{2} \qquad \text{Equation 12}$$

$$y3=(b3-d3/3)*\sqrt{g3/2} \qquad \text{Equation 13}$$

Generally, a point (xi, yi) of the first set of points in the XY plane is transformed from an i-th row of the first matrix coefficients (ri, gi, bi) according to the following Equations 14 and 15:

$$xi=(gi-ri)/\sqrt{2} \qquad \text{Equation 14}$$

$$yi=(bi-di/3)*\sqrt{gi/2} \qquad \text{Equation 15}$$

Figure 6A:
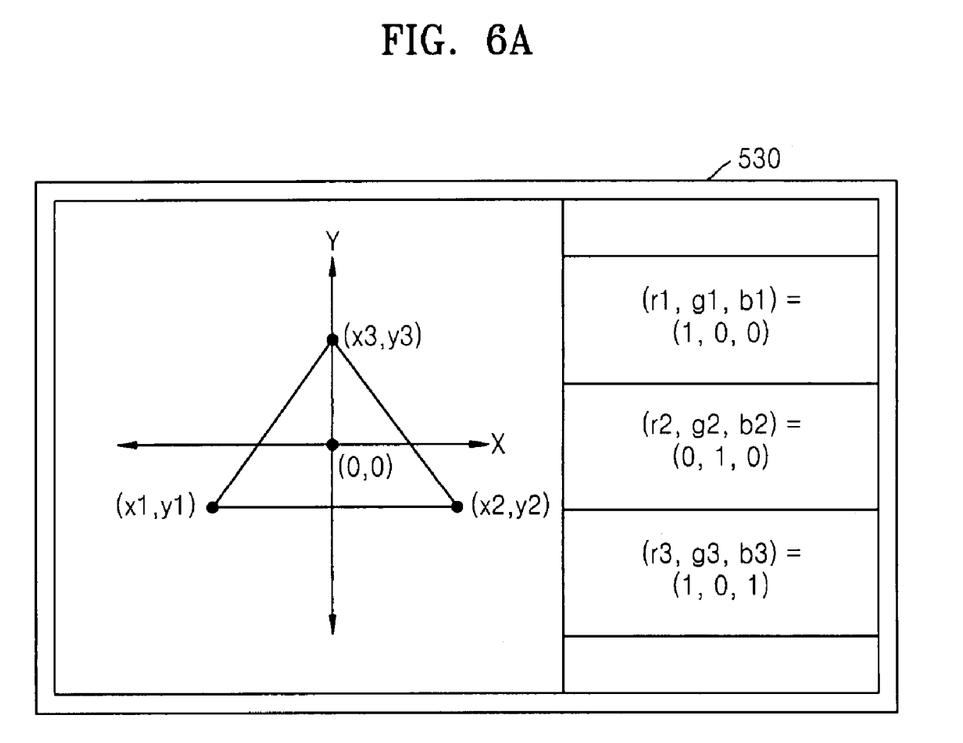
FIGS. 6A and 6B show an example display on a graphic user interface of FIG. 5, according to an embodiment of the present invention.

Further referring to FIGS. 1 and 5, the first set of points (x1, y1), (x2, y2), and (x3, y3) in the XY plane are displayed on the GUI screen 530 (step S120 of FIG. 1). FIG. 6A is an example of such a GUI screen display 530 of the first set of points (x1, y1), (x2, y2), and (x3, y3) in the XY plane. FIG. 6A shows an example for when the first matrix coefficients (r1, g1, b1), (r2, g2, b2), and (r3, g3, b3) in the RGB space is (1, 0, 0), (0, 1, 0), and (0, 0, 1), respectively.

Figure 4:
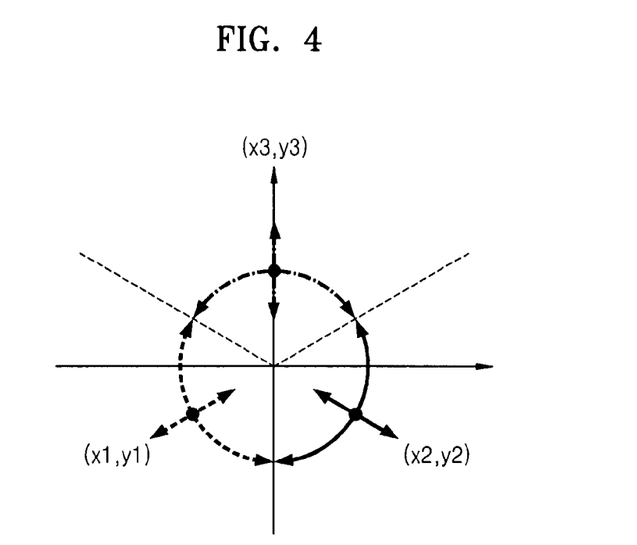
FIG. 4 illustrates three regions having the points of FIG. 3 in the two-dimensional XY plane, according to an embodiment of the present invention.

In addition, as illustrated in FIG. 4, each of the points (x1, y1), (x2, y2), and (x3, y3) in the XY plane is placed into a respective one of three regions in the XY plane. For example, the first point (x1, y1) derived from (r1, g1, b1) for the Rout signal is placed in a first region of the XY plane between 150° and 270° from a positive X-axis of the XY plane. The second point (x2, y2) derived from (r2, g2, b2) for the Gout signal is placed in a second region of the XY plane between 270° and 30° from the positive X-axis of the XY plane. The third point (x3, y3) derived from (r3, g3, b3) for the Bout signal is placed in a third region of the XY plane between 30° and 150° from the positive X-axis of the XY plane.

Further referring to FIGS. 1 and 5, the data processor 520 tunes for image quality by modifying the first set of points (x1, y1), (x2, y2), and (x3, y3) in the XY plane into a second set of points (x1', y1'), (x2', y2'), and (x3', y3') in the XY plane (step S130 of FIG. 1). In one embodiment of the present invention, the first set of points (x1, y1), (x2, y2), and (x3, y3) in the XY plane are modified to the second set of points (x1', y1'), (x2', y2'), and (x3', y3') by changing a position of at least one point among the points of the first set (x1, y1), (x2, y2), and (x3, y3).

In one embodiment of the present invention, the second set of points (x1', y1'), (x2', y2'), and (x3', y3') of the XY plane are transformed back to the RGB space to the second set of matrix coefficients (r1', g1', b1'), (r2', g2', b2'), and (r3', g3', b3') according to the followings.

First, a respective sum di of the ri, gi, and bi (with i=1, 2, and 3) matrix coefficients for each row of the second set of matrix coefficients (r1', g1', b1'), (r2', g2', b2'), and (r3', g3', b3') is represented by the following Equations 16, 17, and 18:

$$r1'+g1'+b1'=d1' \quad \text{Equation 16}$$

$$r2'+g2'+b2'=d2' \quad \text{Equation 17}$$

$$r3'+g3'+b3'=d3' \quad \text{Equation 18}$$

In one example embodiment of the present invention, d1'=d2'=d3'=1.

The second set of matrix coefficients (r1', g1', b1'), (r2', g2', b2'), and (r3', g3', b3') is represented by the following equations 19, 20, 21, 22, 23, 24, 25, 26, and 27:

$$r1'=(-1/\sqrt{2})*x1'-(1/\sqrt{6})*y1'+d1'/3 \quad \text{Equation 19}$$

$$g1'=(1/\sqrt{2})*x1'-(1/\sqrt{6})*y1'+d1'/3 \quad \text{Equation 20}$$

$$b1'=(-2/\sqrt{6})*y1'+d1'/3 \quad \text{Equation 21}$$

$$r2'=(-1/\sqrt{2})*x2'-(1/\sqrt{6})*y2'+d2'/3 \quad \text{Equation 22}$$

$$g2'=(1/\sqrt{2})*x2'-(1/\sqrt{6})*y2'+d2'/3 \quad \text{Equation 23}$$

$$b2'=(-2/\sqrt{6})*y2'+d2'/3 \quad \text{Equation 24}$$

$$r3'=(-1/\sqrt{2})*x3'-(1/\sqrt{6})*y3'+d3'/3 \quad \text{Equation 25}$$

$$g3'=(1/\sqrt{2})*x3'-(1/\sqrt{6})*y3'+d3'/3 \quad \text{Equation 26}$$

$$b3'=(-2/\sqrt{6})*y3'+d3'/3 \quad \text{Equation 27}$$

Generally, an i-th row of the second matrix coefficients (ri', gi', bi') is transformed from a point (xi', yi') by the data processor 520 (step S140 of FIG. 1) according to the following Equations 28, 29, and 30:

$$ri'=(-1/\sqrt{2})*xi'-(1/\sqrt{6})*yi'+di'/3 \quad \text{Equation 28}$$

$$gi'=(1/\sqrt{2})*xi'-(1/\sqrt{6})*yi'+di'/3 \quad \text{Equation 29}$$

$$bi'=(-2/\sqrt{6})*yi'+di'/3 \quad \text{Equation 30}$$

Figure 7:
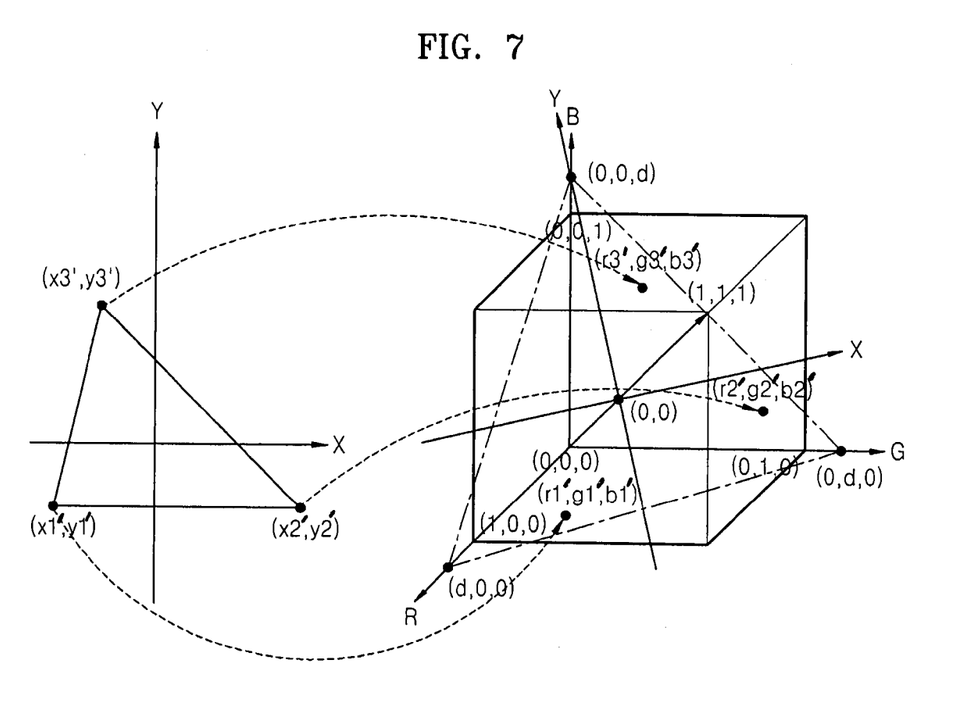
FIG. 7 is a conceptual view illustrating transforming points in the two dimensional XY plane back to matrix coefficients of the three-dimensional RGB space, in the steps of the flowchart of FIG. 1 according to an embodiment of the present invention.

FIG. 7 is a conceptual view illustrating transforming the second set of points in the two-dimensional XY plane to the second set of matrix coefficients of the three-dimensional RGB space (step S140 of FIG. 1), according to an embodiment of the present invention. Referring to FIG. 7, the first modified point (x1', y1') in the two-dimensional XY plane is transformed to the first tuned point (r1', g1', and b1') in the three-dimensional RGB space.

Similarly, the second modified point (x2', y2') in the two-dimensional XY plane is transformed to the second tuned point (r2', g2', and b2') in the three-dimensional RGB space. Furthermore, the third modified point (x3', y3') in the two-dimensional XY plane is transformed to the third tuned point (r3', g3', and b3') in the three-dimensional RGB space.

Figure 6B:
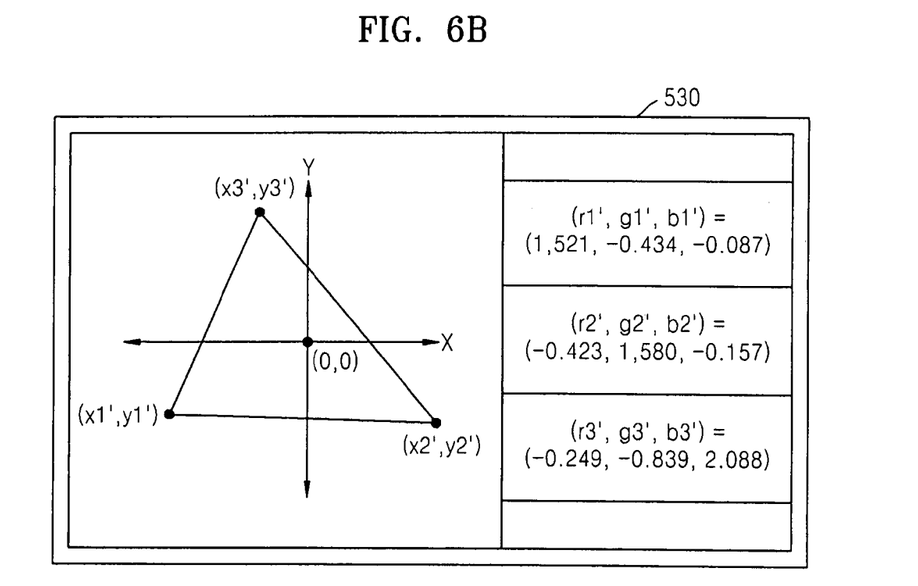

Further referring to FIGS. 1 and 5, such a set of modified points (x1', y1'), (x2', y2'), and (x3', y3') in the XY plane is displayed on the GUI screen 530 (step S150 of FIG. 1). FIG. 6B is an example of such a GUI screen display 530 of the second set of points (x1', y1'), (x2', y2'), and (x3', y3') in the XY plane. The change of the position of the points of the second set (x1', y1'), (x2', y2'), and (x3', y3') in FIG. 6B from the position of the points of the first set (x1, y1), (x2, y2), and (x3, y3) in FIG. 6A provides a visualization of the color correction of the Rin, Gin, and Bin of the image signals using the second set of matrix coefficients (r1', g1', b1'), (r2', g2', b2'), and (r3', g3', b3') of the RGB space. For example, the change of a third point of the second set (x3', y3') from a third point of the first set (x3, y3) is larger than the change for points (x1', y1') and (x2', y2') of the second set. The above changes visualize that the color correction of the Bin component is increased more than that of the Rin and Gin components.

In addition, FIG. 6B shows the example GUI screen 530 outputting the second set of matrix coefficients (r1', g1', b1'), (r2', g2', b2'), and (r3', g3', b3') of the RGB space (step S160 of FIG. 1) corresponding to the second set of points (x1', y1'), (x2', y2'), and (x3', y3') on the GUI screen. For example, FIG. 6B illustrates that (r1, g1, b1)=(1, 0, 0) has been tuned to (r1', g1', b1')=(1.521, −0.434, −0.087). Similarly, FIG. 6B illustrates that (r2, g2, b2)=(0, 1, 0) has been tuned to (r2', g2', b2')=(−0.423, 1.580, −0.157). Furthermore, FIG. 6B illustrates that (r3, g3, b3)=(0, 0, 1) has been tuned to (r3', g3', b3')=(−0.249, −0.839, 2.088).

In one embodiment of the present invention, for improving sharpness of the image, the second set of points (x1', y1'), (x2', y2'), and (x3', y3') are vertexes of a triangle with an extended area from a triangle defined by points (x1, y1), (x2, y2), and (x3, y3) as its vertexes.

In this manner, the extent of tuning for image quality may be visualized on the GUI screen to provide a user an intuitive sense of the extent of tuning for image quality. While the present invention has been particularly shown and described with reference to exemplary embodiments thereof, it will be understood by those of ordinary skill in the art that various changes in form and details may be made therein without departing from the spirit and scope of the present invention as defined by the following claims.

The present invention is limited only as defined in the following claims and equivalents thereof.

What is claimed is:

1. A method of performing color correction for an image signal, comprising:

transforming a first set of matrix coefficients for color correction of the image signal in a 3-dimensional RGB color space to a first set of points of a two-dimensional XY plane display device;

modifying the first set of points to a second set of points in the XY plane for tuning image quality, wherein said second set of points in the XY plane corresponds to a second set of matrix coefficients in said 3-dimensional RGB color space with said second set of matrix coefficients used for said color correction of the image signal with said tuned image quality; and displaying the first and second sets of points in the two-dimensional XY plane.

2. The method of claim 1, wherein the first and second sets of points in the two-dimensional XY plane are displayed on a GUI (graphical user interface) screen of a computer system.

3. The method of claim 1, further comprising:
transforming the second set of points in the XY plane to said second set of matrix coefficients in the RGB color space.

4. The method of claim 3, wherein a respective coefficient sum of each of all rows of the matrix coefficients is equal to a same value.

5. The method of claim 4, wherein the same value is 1.

6. The method of claim 5, wherein an origin of the XY plane is a center point of a unit cube of the RGB color space.

7. The method of claim 6, wherein a Y axis of the XY plane is a line connecting the origin to a B axis of the RGB color space, and an X axis of the XY plane is a line perpendicularly crossing the Y axis at the origin.

8. The method of claim 7, wherein the first set of matrix coefficients are transformed to the first set of points of the XY plane according to the following equations:

$$xi=(gi-ri)/\sqrt{2}; \text{and}$$

$$yi=(bi-di/3)*\sqrt{gi/2};$$

with xi and yi being a point in the XY plane for ri, gi, and bi representing an i-th row for the first set of matrix coefficients in the RGB color space, and with di being a sum of ri, gi, and bi; and wherein the method further includes the step of:
transforming the second set of points in the XY plane to a second set of matrix coefficients in the RGB color space according to the following equations:

$$ri'=(-1/\sqrt{2})*xi'-(1/\sqrt{6})*yi'+di'/3;$$

$$g1'=(1/\sqrt{2})*x1'-(1/\sqrt{6})*y1'+d1'/3; \text{and}$$

$$b1'=(-2/\sqrt{6})*y1'+d1'/3;$$

with ri', gi', and bi' representing an i-th row for the second set of matrix coefficients in the RGB color space, and with xi' and yi' being modified from xi and yi in said step B, and with di' being a sum of ri', gi', and bi'.

9. The method of claim 8, wherein a first point of the first set is for a R among RGB, and is placed at a region between 150° and 270° from a positive X-axis of the XY plane, and wherein a second point of the first set is for a G among RGB, and is placed at a region between 270° and 30° from the positive X-axis, and wherein a third point of the first set is for a B among RGB, and is placed at a region between 30° and 150° from the positive X-axis.

10. The method of claim 9, wherein the first set of points are modified to the second set of points by changing a position of at least one point among the first through the third points of the first set.

11. A system for performing color correction of an image signal, comprising:
a display;
a data processor; and
a memory device having sequences of instructions stored thereon, wherein execution of the sequences of instructions by the data processor causes the data processor to perform the steps of:
transforming a first set of matrix coefficients for color correction of the image signal in a 3-dimensional RGB color space to a first set of points of a two-dimensional XY plane;
modifying the first set of points to a second set of points in the XY plane for tuning image quality, wherein said second set of points in the XY plane corresponds to a second set of matrix coefficients in said 3-dimensional RGB color space with said second set of matrix coefficients used for said color correction of the image signal with said tuned image quality; and
displaying the first and second sets of points and the two-dimensional XY plane on the display.

12. The system of claim 11, wherein the display is a GUI (graphical user interface) screen of a computer system.

13. The system of claim 11, wherein execution of the sequences of instructions by the data processor causes the data processor to further perform the step of:
transforming the second set of points in the XY plane to said second set of matrix coefficients in the RGB color space.

14. The system of claim 13, wherein a respective coefficient sum of each of all rows of the matrix coefficients is equal to a same value.

15. The system of claim 11, wherein an origin of the XY plane is determined by the data processor as a center point of a unit cube in the RGB color space.

16. The system of claim 15, wherein a Y axis of the XY plane is determined by the data processor as a line connecting the origin to a B axis of the RGB color space, and an X axis of the XY plane is determined by the data processor as a line perpendicularly crossing the Y axis at the origin.

17. The system of claim 16, wherein the first set of matrix coefficients are transformed by the data processor to the first set of points of the XY plane according to the following equations:

$$xi=(gi-ri)/\sqrt{2}; \text{and}$$

$$yi=(bi-di/3)*\sqrt{gi/2};$$

with xi and yi being a point in the XY plane for ri, gi, and bi representing an i-th row for the first set of matrix coefficients in the RGB color space, and with di being a sum of ri, gi, and bi; and wherein execution of the sequences of instructions by the data processor causes the data processor to further perform the step of:
transforming the second set of points in the XY plane back to a second set of matrix coefficients in the RGB color space according to the following equations:

$$ri'=(-1/\sqrt{2})*xi'-(1/\sqrt{6})*yi'+di'/3;$$

$$g1'=(1/\sqrt{2})*x1'-(1/\sqrt{6})*y1'+d1'/3; \text{and}$$

$$b1'=(-2/\sqrt{6})*y1'+d1'/3;$$

with ri', gi', and bi' representing an i-th row for the second set of matrix coefficients in the RGB color space, and with xi' and yi' being modified from xi and yi in said step B, and with di' being a sum of ri', gi', and bi'.

18. The system of claim 17, wherein a first point of the first set is for a R among RGB, and is placed by the data processor at a region between 150° and 270° from a positive X-axis of the XY plane, and wherein a second point of the first set is for a G among RGB, and is placed by the data processor at a region between 270° and 30° from the positive X-axis, and wherein a third point of the first set is for a B among RGB, and is placed by the data processor at a region between 30° and 150° from the positive X-axis.

19. The system of claim 18, wherein execution of the sequences of instructions by the data processor cause the data processor to further perform the step of:

modifying the first set of points to the second set of points by changing a position of at least one point among the first through the third points of the first set.

20. A method of performing color correction for an image signal, comprising:

transforming a first set of matrix coefficients for color correction of the image signal in a 3-dimensional RGB color space to a first set of points of a two-dimensional XY plane;

modifying the first set of points to a second set of points in the XY plane for tuning image quality; and displaying the first and second sets of points in the two-dimensional XY plane, wherein a respective coefficient sum of each of all rows of the matrix coefficients is equal to a same value.

* * * * *